US012068668B2

United States Patent
Tang et al.

(10) Patent No.: US 12,068,668 B2
(45) Date of Patent: Aug. 20, 2024

(54) ELECTRIC MACHINE COOLING

(71) Applicant: Honeywell International Inc., Charlotte, NC (US)

(72) Inventors: Benjamin Tang, Monterey Park, CA (US); Ami Bhavsar, Hermosa Beach, CA (US); Michael Leighty, Westminster, CA (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 17/810,997

(22) Filed: Jul. 6, 2022

(65) Prior Publication Data

US 2023/0015125 A1 Jan. 19, 2023

Related U.S. Application Data

(60) Provisional application No. 63/219,761, filed on Jul. 8, 2021.

(51) Int. Cl.
*H02K 9/20* (2006.01)
*H02K 9/00* (2006.01)
*H02K 9/19* (2006.01)

(52) U.S. Cl.
CPC ..................... *H02K 9/20* (2013.01)

(58) Field of Classification Search
CPC ............... H02K 9/00; H02K 9/20; H02K 9/19
USPC .............................. 310/52, 54, 58
See application file for complete search history.

(56) References Cited

U.S. PATENT DOCUMENTS

| | | | |
|---|---|---|---|
| 3,089,969 | A | 5/1963 | Wiedemann |
| 4,404,055 | A | 9/1983 | McCarty et al. |
| 6,515,383 | B1 | 2/2003 | Ognibene et al. |
| 7,443,062 | B2 | 10/2008 | Dong et al. |
| 7,633,193 | B2 | 12/2009 | Masoudipour et al. |
| 8,169,110 | B2 | 5/2012 | Swales et al. |
| 8,581,455 | B2 | 11/2013 | Woolmer |
| 9,395,111 | B2 | 7/2016 | Sommer et al. |
| 10,305,352 | B2 | 5/2019 | Dhawan |

(Continued)

FOREIGN PATENT DOCUMENTS

| | | |
|---|---|---|
| CN | 102097907 B | 3/2013 |
| CN | 112412780 A | 2/2021 |

(Continued)

OTHER PUBLICATIONS

Fujita et al., "Newly Developed Motor Cooling Method Using Refrigerant," MDPI, World Electric Vehicle Journal, vol. 10, No. 38, doi:10.3390/wevj10020038, Jun. 4, 2019, 10 pp.

(Continued)

*Primary Examiner* — Jose A Gonzalez Quinones
(74) *Attorney, Agent, or Firm* — Shumaker & Sieffert, P.A.

(57) ABSTRACT

An example system includes a housing configured to house a portion of an electric machine and a heat transfer material, the heat transfer material is configured to contact a conductor of the portion of the electric machine and to remove heat from the conductor and transfer heat to the housing. The system includes a coolant configured to remove heat from the housing. An inner surface of the housing comprises a plurality of structures configured to increase an inner surface area of the housing, wherein the plurality of structures are configured to contact the heat transfer material.

15 Claims, 4 Drawing Sheets

(56) References Cited

U.S. PATENT DOCUMENTS

| | | | |
|---|---|---|---|
| 2005/0194847 | A1 | 9/2005 | Gromoll et al. |
| 2006/0017335 | A1 | 1/2006 | Matin et al. |
| 2008/0169796 | A1* | 7/2008 | Masoudipour ...... H02M 3/1582 323/282 |
| 2008/0273990 | A1* | 11/2008 | Pham ................ F04D 13/0653 417/366 |
| 2009/0206687 | A1 | 8/2009 | Woody et al. |
| 2011/0008184 | A1 | 1/2011 | De Boer |
| 2015/0207388 | A1* | 7/2015 | Sugimoto ............. H02K 5/203 310/54 |
| 2015/0280526 | A1 | 10/2015 | Chamberlin et al. |
| 2017/0029679 | A1 | 2/2017 | Van Horn et al. |

FOREIGN PATENT DOCUMENTS

| | | | | |
|---|---|---|---|---|
| CN | 112491206 | A | 3/2021 | |
| EP | 1947757 | A2 | 7/2008 | |
| JP | 10336968 | A * | 12/1998 | ............ B60L 11/123 |
| JP | 2011254570 | A * | 12/2011 | ............... H02K 9/20 |
| JP | 2021057995 | A | 4/2021 | |
| KR | 20190093796 | A | 8/2019 | |
| KR | 20210065676 | A | 6/2021 | |
| WO | WO-0237648 | A1 * | 5/2002 | ............... H02K 9/20 |
| WO | 2020077778 | A1 | 4/2020 | |

OTHER PUBLICATIONS

Gronwald et al., "Traction motor cooling systems, a literature review and comparative study," IEEE, Transactions on Transportation Electrification, DOI 10.1109/TTE.2021.3075844, downloaded Apr. 28, 2021, 21 pp.

U.S. Appl. No. 17/650,063, by Honeywell International Inc. (Inventors: Benjamin Tang et al.), filed Feb. 4, 2022.

Extended Search Report from counterpart European Application No. 22183754.5 dated Nov. 25, 2022, 9 pp.

"A Better Environment with Next-Generation Solstice zd Refrigerant," Honeywell Refrigerants, Honeywell Belgium N.V. Heverlee Belgium, Applicant points out, in accordance with MPEP 609.04(a), that the year of publication, 2018, is sufficiently earlier than the effective U.S. filing date, so that the particular month of publication is not in issue.) 2018, 7 pp.

Office Action from U.S. Appl. No. 17/650,063 dated Mar. 24, 2023, 17 pp.

Response to Extended Search Report dated Nov. 25, 2022, from counterpart European Application No. 22183754.5 filed Jan. 17, 2023, 31 pp.

Final Office Action from U.S. Appl. No. 17/650,063 dated Sep. 28, 2023, 17 pp.

Response to Office Action dated Mar. 24, 2023 from U.S. Appl. No. 17/650,063, filed Jun. 26, 2023, 13 pp.

Response to Office Action dated Sep. 28, 2023 from U.S. Appl. No. 17/650,063, filed Nov. 28, 2023, 5 pp.

Advisory Action from U.S. Appl. No. 17/650,063 dated Jan. 8, 2024, 3 pp.

Response to Final Office Action dated Sep. 28, 2023, and the Advisory Action dated Jan. 8, 2024, from U.S. Appl. No. 17/650,063, filed Feb. 8, 2024, 9 pp.

Office Action from U.S. Appl. No. 17/650,063 dated Apr. 18, 2024, 17 pp.

* cited by examiner

ELECTRIC MACHINE COOLING

This application claims the benefit of U.S. Provisional application No. 63/219,761, entitled "ELECTRIC MACHINE COOLING" and filed on Jul. 8, 2021, which is incorporated herein by reference in its entirety.

TECHNICAL FIELD

The present disclosure relates to electric machines.

BACKGROUND

An electric machine may be an electromechanical energy converter that converts electrical energy to mechanical energy (e.g., in the case of an electric motor) or mechanical energy to electrical energy (e.g., in the case an electric generator). Rotating electric machines may use electromagnetic forces between a stator and a rotor during operation. Alternating electrical currents in electric machines may be carried by windings comprised of one or more conductors wound around a magnetic material. Conductors may be cooled to maintain a temperature range.

SUMMARY

In general, the disclosure describes techniques for cooling an electric machine. A rotary mechanical system, such as a compressor, includes an electric machine, such as an electric motor, and a housing that houses various components of the electric machine, such as a rotor in a rotor cavity and a stator in a stator cavity. To cool electrical components within the housing, such as the stator, the housing includes a liquid coolant circulated through the housing and a refrigerant sealed within the housing. A portion of the heat generated by electrical components may transfer to the housing through thermal conduction, such as from portions of electrical components attached to the housing. Another portion of the heat generated from electrical components may transfer to the housing by the refrigerant, such as through convection of a liquid phase of the refrigerant or through evaporation and subsequent condensation of a vapor phase of the refrigerant against the wall of the housing or another cool surface coupled to the housing. The liquid coolant removes heat from the housing. A portion of the heat generated from electrical components that may not be submerged in the refrigerant, e.g., end turns of stator conductors, may be removed by condensed refrigerant guided to drip onto exposed portions of motor end turns by radial cooling fins inside the motor housing. In this way, rotary mechanical systems described herein may have increased heat transfer to the liquid cooling system, permitting higher power density in the electric machine and lower operating temperature.

In some examples, this disclosure includes a method of cooling a device, the method comprising: cooling, via a refrigerant, a conductor of a portion of an electric machine, wherein the refrigerant and the portion of the electric machine are sealed within a housing, wherein an inner surface of the housing comprises a plurality of structures configured to increase the inner surface area of the housing and configured to contact the refrigerant; cooling, via a coolant, the housing, wherein the coolant is separated from the portion of the electric machine by the housing.

In one examples, this disclosure describes a system comprising: a housing configured to house a portion of an electric machine and a refrigerant, wherein the refrigerant is configured to contact a conductor of the portion of the electric machine, wherein the refrigerant is configured to remove heat from the conductor and transfer heat to the housing; and a coolant configured to remove heat from the housing, wherein an inner surface of the housing comprises a plurality of structures configured to increase the inner surface area of the housing and configured to contact the refrigerant.

In another example, this disclosure describes mechanical and cooling system, comprising; a rotary mechanical system, comprising: an electric machine; a housing at least partially enclosing one or more components of the electric machine, the housing defining: an electrical cavity housing one or more electrical components, wherein an inner surface of the housing comprises a plurality of structures configured to increase an inner surface area of the electrical cavity; and a coolant cavity, wherein the housing includes a two-phase refrigerant sealed within the electrical cavity; and a liquid cooling system fluidically coupled to the coolant cavity and configured to supply a liquid coolant to the coolant cavity.

The details of one or more examples are set forth in the accompanying drawings and the description below. Other features, objects, and advantages will be apparent from the description and drawings, and from the claims.

DETAILED DESCRIPTION

Figure 1A:
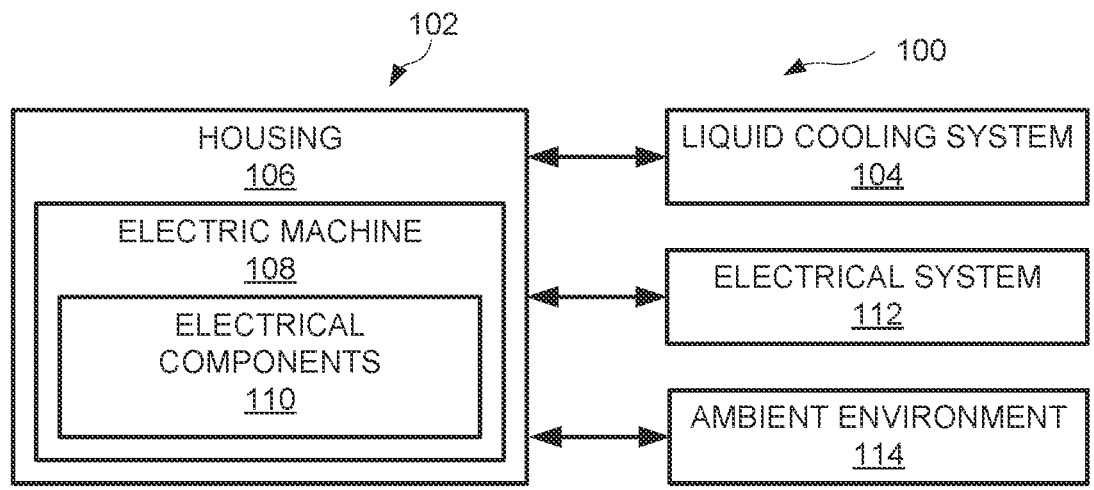
FIG. 1A is a schematic block diagram of an example mechanical and cooling system.

New generations of large power motors and generators have higher power densities that may need improved, effective cooling. On aircraft, the preferred cooling medium is water and glycol solution, e.g., water-glycol or ethylene glycol (EGW), due to its high heat capacity and heat conductivity. Water-glycol is an efficient heat carrying medium for aircraft applications, but water-glycol is also an ionic fluid and is conductive. If water-glycol directly contacts electrical equipment and electronic components, such as stator windings of an electric machine, the water glycol may cause short circuits. To remove heat from electrical equipment using water-glycol, cold plates or cooling jackets may be utilized, for example, to separate the water-glycol from contact with the electrical equipment and/or electronic components. However, the cold plates or cooling jackets may lower, sometimes significantly, the heat transfer effectiveness of the water glycol compared to a cooling system in which the electrical equipment and electronic components are submerged in a coolant, such as a flowing oil-based coolant such as poly alpha olefin (PAO). A potential disadvantage of using an oil-based coolant such as PAO as a cooling medium is that a cooling system including PAO may need a relatively larger heat exchanger configured to reject heat from the PAO to the environment, a relatively larger piping system to distribute the cooling medium (PAO), and relatively larger liquid pump to move the PAO. In other words, while the electrical equipment/components being cooled may benefit from a cooling system employing a flowing coolant medium in direct contact with the electrical equipment/components, non-electrical equipment, such as components supporting the cooling such as a heat exchanger, piping, and pump may not benefit. Thus, the entire system may trade-off at least size and weight relative to a cooling system employing glycol-water.

However, for a cooling system employing a coolant, such as water-glycol, flowing through a cooling jacket or cooling plate and not in direct contact with the electrical equipment/components being cooled, not all the electrical equipment and/or components can directly contact the cooling jackets or cold plates. For example, cooling jackets and cold plates are generally made of metal to increase heat conduction. Some electrical equipment must be electrically isolated from metal surfaces. To improve heat transfer from electrical equipment with such a system, thermal compounds or thermal grease may be added between the electrical equipment/components and cooling jackets or cold plates. However, over time, gaps or cracks may develop in the thermal compound or grease potting, thereby reducing the heat transfer effectiveness due to gaps and cracks in the thermal compounds and/or grease. Additionally, some thermal compounds contain metal substrates to improve conductivity, and the metal substrate may reduce the electrical isolation or dielectric strength of the electrical equipment/components.

According to systems, device, and techniques disclosed here, a cooling system may use water-glycol or other coolants and/or electrically conductive coolants as the system cooling medium. In some examples, for smaller and higher power-density electric machines, the systems and techniques disclosed herein may enable and/or improve the use of water-glycol cooling systems in aircraft. For example, instead of using thermal compound or thermal grease to aid heat transfer between the electrical equipment/components, a cooling medium such as a refrigerant may be included within a housing configured to house the electrical equipment or electronic components. In some examples, the refrigerant may be HFO-1233zd or r-1233zd, e.g., Honeywell Solstice® zd from Honeywell International Inc. of Charlotte, North Carolina. The r-1233zd's unique properties of high critical temperature (167 C), low freeze temperature (−107 C), and low saturation pressure may improve the performance of a water-glycol cooling system. In some examples, the refrigerant may be R-112 and/or R-123. In some examples, a refrigerant sealed within a housing and at least in partial contact with electrical equipment/components (e.g., such as stator windings) may improve a cooling system using a relatively hot water-glycol, and may enable the use of relatively higher power density electrical equipment/components with a relatively hot water-glycol cooling medium. In other words, a two-stage refrigerant may improve the heat transfer between electrical equipment/components and a water-glycol cooling medium.

In some examples, the electrical equipment to be cooled may be enclosed within a pressurized vessel or housing. The housing may be at least partially filled with liquid refrigerant (e.g., r-1233zd) and partially filled with gaseous or vapor refrigerant. For example, the housing may seal off and/or enclose a stator portion or stator volume including at least a portion of the stator and windings and configured to seal liquids, such as a refrigerant, within the stator volume. The liquid portion of the refrigerant may be less than the available volume within the housing (e.g., less than the available stator volume) to allow room for thermal expansion of the liquid portion. Hot spots in the electrical equipment (e.g., windings) may vaporize the refrigerant that contacts the electrical equipment and transfer heat to the vaporizing refrigerant. The hotter vapor may then transfer heat to liquid refrigerant within the housing or to colder metal surfaces of a cooling jacket or a cold plate, or the colder surfaces of the pressurized housing. In some examples, the cooling jacket or cold plate cooled by water-glycol may be the housing, or a portion of the housing may be configured to function as a "cooling jacket" and may comprise channels, tubes, or the like within walls of the housing configured to allow the water-glycol to flow within the tubes/channels, and portions of the housing may be configured to function as a "cold plate," e.g., portions near the channels/tubes. In some examples, the cooling jacket or cold plate cooled by water-glycol may be separate from the housing and included within the housing or adjacent to the housing, or in thermal contact with the housing. The higher heat transfer effectiveness of the refrigerant within the housing may allow for a higher power density in motor, generator, power electronics, and other electrical equipment. The higher power density may reduce equipment weight and volume. The lower operating temperature resulting a higher heat transfer effectiveness enabled by the refrigerant may also increase electrical operating efficiency. Additionally, having electrical equipment sealed in a pressurized vessel may reduce and/or eliminate potential short circuits from moisture entrainment and corrosion.

In some examples, water-glycol may reduce coolant flow requirements and enable higher temperatures to minimize the size of the heat exchangers that reject heat to an ambient environment (e.g., a volume of air) from the water-glycol. In some examples, heat transfer effectiveness of the refrigerant within the housing may be increased by increasing the inner surface area of the housing and/or cooling jacket including water-glycol and by directing condensed refrigerant within the housing towards the electrical equipment/components that may not be submerged in the liquid refrigerant or directly back to the liquid portion of the refrigerant from the condensing surface.

Additionally, according to the examples, systems, and techniques disclosed herein, radial cooling fins may be added to the inside surface of the motor housing, e.g., an inside surface of the housing defining the stator volume. Cooling fins submerged in liquid refrigerant may increase the subcooling of the liquid refrigerant, and cooling fins not submerged in the liquid refrigerant, e.g., that are above a liquid level of the refrigerant and are within a portion of the stator volume including superheated refrigerant gas, may provide increased surface area for condensing the refrigerant and guiding the condensed refrigerant (e.g., refrigerant droplets) towards the electrical equipment or the liquid refrigerant, e.g., to "rain down" on the electrical equipment and/or liquid refrigerant portion of the stator volume. In other words, the cooling fins exposed to the refrigerant gas and above the liquid level may be condensing surfaces configured to guide the condensed refrigerant to drip onto electrical equipment/components such as conductive windings, and may improve the cooling of the electrical equipment, particularly portions of the electrical equipment that may be farther from the cooling jacket and/or cold plat such as end turns of the windings. The liquid refrigerant raining down on the electrical equipment may vaporize to remove heat from the electrical equipment, e.g., the end turns of the windings. Alternatively, or additionally, an external heat exchanger for the refrigerant may be placed above the electric machine. The housing may be configured to allow the vaporized gas to flow through the refrigerant heat exchanger to dump a portion of its heat in addition to condensing into liquid on inner surfaces of the housing and/or the colling fins to improve cooling of the electrical equipment. In some examples, a system including refrigerant and water-glycol coolant may be used with large high-power density electric machines, such as those powering aircraft cabin air compressors and propellers, and large rotating generators.

FIG. 1A is a schematic block diagram of an example mechanical and cooling system 100. Mechanical and cooling system 100 includes a rotary mechanical system 102 and a liquid cooling system 104 fluidically coupled to rotary mechanical system 104.

Rotary mechanical system 102 is electrically coupled to an electrical system 112, such as by wiring or another electrical conduit. Rotary mechanical system 102 includes an electric machine 108, one or more electrical components 110, and a housing 106 housing at least a portion of electric machine 108 and electrical components 110. In examples in which electric machine 108 is an electric motor, electrical system 112 may supply electrical current to electric machine 108, while in examples in which electric machine 108 is an electric generator, electrical system 112 may receive electrical current generated by electric machine 108. Regardless, electric machine 108 may include one or more electrical components 110 configured to receive electrical current from electrical system 112 and use the electrical current to control electromagnetic forces used for electromechanical conversion by electric machine 108.

Liquid cooling system 104 may be fluidically coupled to housing 106, such as by piping or another fluid conduit. Liquid cooling system 104 may be configured to supply a liquid coolant to housing 106 to remove heat from housing 106 and components of rotary mechanical system 102 within housing 106. For example, liquid cooling system 104 may be configured to circulate the liquid coolant between housing 106 and one or more heat exchangers, and condition and supply the liquid coolant to remove heat from housing 106 at a particular rate.

Liquid cooling system 104 may be configured to supply an ionic liquid coolant. An ionic liquid coolant may have a relatively high heat capacity (e.g., greater than 3 KJ/kg·° C.) for absorbing heat and a relatively high thermal conductivity (e.g., greater than 0.2 W/m·K) for transferring heat. In some examples, the liquid coolant of liquid cooling system 104 includes ethylene glycol and water, such as in a volume ratio between about 80:20 and about 20:80.

Housing 106 may be positioned within an ambient environment 114 of a vehicle, such as an unpressurized chassis of an aircraft. During operation of electric machine 108, a temperature of ambient environment 114 may be substantially lower than a temperature of housing 106 of rotary mechanical system 102. For example, ambient environment 114 may be supplied with ram air or other low temperature, high volume medium that contacts an outer surface of housing 106.

Figure 1B:
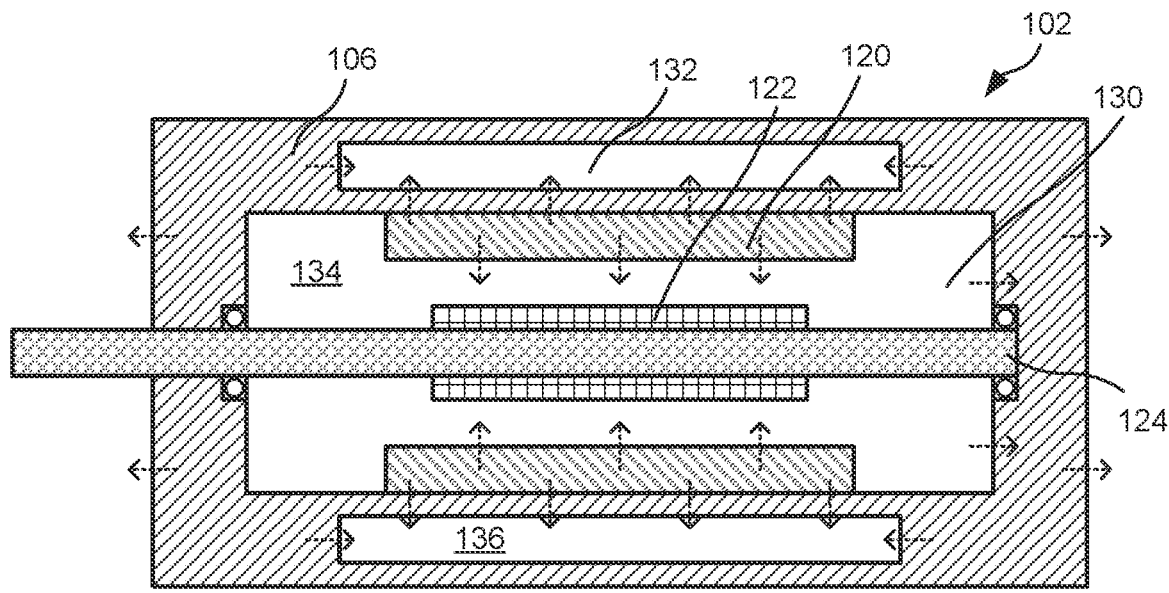
FIG. 1B is a cross-section side view diagram illustrating the example rotary mechanical system of the example mechanical and cooling system of FIG. 1A.

Housing 106 may be configured to use both a circulated liquid coolant and a sealed two-phase refrigerant to remove heat from components of electric machine 108. FIG. 1B is a cross-section side view diagram along a rotational axis illustrating the example rotary mechanical system 102 of the example mechanical and cooling system 100 of FIG. 1A. In the example of FIG. 1B, rotary mechanical system 102 includes electric machine 108 that includes a stator 120, a rotor 122, and a shaft 124 attached to rotor 122. In the example electric machine 108 of FIG. 1B, stator 120 may generate a magnetic field that interacts with an electrical current in windings of rotor 122 to generate an electromotive force on rotor 122 and, correspondingly, shaft 124.

Housing 106 defines one or more component cavities each configured to house one or more components of electric machine 108 and other components and/or media of rotary mechanical system 102. In the example of FIG. 1B, housing 106 includes an electrical cavity 130 and a coolant cavity 132; however, in other examples, housing 106 may include additional cavities, and either of electrical cavity 130 or coolant cavity 132 may include more than one cavity. The one or more component cavities are at least partially formed by a wall of housing 106 and include various exposed surfaces of the wall of housing 106.

Electrical cavity 130 is configured to house one or more electrical components of electric machine 108. In the example of FIG. 1B, the one or more electrical components housed by electrical cavity 130 includes stator 120; however, in other examples, the one or more electrical components may include a controller or other electrical equipment or electronics associated with operation of electric machine 108. Electrical cavity 130 includes one or more surfaces configured to mount the electrical components 110, such as stator 120, such that electrical components 110 are coupled to a wall of housing 106 and in thermal communication with housing 106. For example, stator 120 may be mounted on an inner surface of the wall of housing 106 in electrical cavity 130, such that heat generated during operation of stator 120 may be transferred to housing 106 through conduction.

Coolant cavity 132 is configured to receive a liquid coolant 136 from a liquid coolant system, such as liquid cooling system 104 of FIG. 1A, and guide liquid coolant 136 through housing 106. While illustrated as a single open cavity, coolant cavity 132 may include cavities in a variety of configurations, such as coolant channels that run axially or circumferentially around or along housing 106. In some examples, coolant cavity 132 may substantially surround electric machine 108 and/or electrical cavity 130. While coolant cavity 132 is illustrated as being integral with other portions of housing 106, in other examples, coolant cavity 132 may be separate from other portions of housing 106. For example, housing 106 may include an electric machine housing that includes electrical cavity 130, an impeller housing that includes an output of shaft 124, and a cooling jacket that surrounds the electric machine housing and defines coolant cavity 132.

During power generation, electrical components 110 of electric machine 108 in electrical cavity 130, such as electromagnetic windings of stator 120 and conductive windings of rotor 122, and mechanical components, such as bearings, may generate substantial amounts of heat. Electrical components 110 that are coupled to an inner surface of a wall of electrical cavity 130 such as stator 120 in FIG. 1B may transfer at least a portion of the generated heat to housing 106 through conduction. While a portion of the heat transferred to housing 106 may discharge to ambient environment 114 external to housing 106, such ambient heat losses may not be sufficient to maintain components of electric machine 108 below a desired temperature. Coolant cavity 132 may be configured to remove heat from housing 106 by transferring at least a portion of the heat from housing 106 to the liquid coolant in coolant cavity 132. The substantially higher heat transfer properties of the liquid coolant, such as specific heat and thermal conductivity, compared to ambient air may enable a greater amount of heat to be removed from housing 106 compared to a system that does not include coolant cavity 132.

To further enhance heat removal and provide direct cooling to these components, coolant cavity 132 may share at least one wall with electrical cavity 130, such that electrical cavity 130 is in relatively high thermal communication with coolant cavity 132. The shared wall may have a thickness that is substantially small to increase heat flux from the electrical components through the shared wall to the liquid coolant of coolant cavity 130. In some examples, the shared wall includes at least 30 percent of a surface area of an inner surface of electrical cavity 130.

While the liquid coolant of coolant cavity 132 may remove heat transferred to housing 106 by electrical components in close contact with an inner surface of electrical cavity 132, other electrical components or portions of electrical components may be further from coolant cavity 132. To further enhance heat removal from electrical components within electrical cavity 130, housing 106 is configured to seal a two-phase refrigerant 134 within electrical cavity 130. Refrigerant 134 may enhance heat removal between electrical components, such as radially inward surfaces of stator 120, and various heat-generating mechanical components, such as bearings, to housing 106.

Refrigerant 134 may be configured to operate as a two-phase refrigerant within the operating conditions of electric machine 108 and at a relatively low pressure. For example, refrigerant 134 may have a critical temperature greater than about 150 degrees Celsius (° C.), a critical pressure less than about 50 MPa, and/or a freezing temperature less than about negative ($-100°$) C. In some examples, refrigerant 134 includes at least one of HFO-1233zd, R-1233zd, R-112, or R-123. Refrigerant 134 may be maintained within electrical cavity 130 as a two-phase refrigerant. For example, as refrigerant 134 is heated, a volume fraction of refrigerant 134 as a vapor may increase within electrical cavity 130 and, correspondingly, a pressure may increase within electrical cavity 130, thereby counteracting the increase in vapor fraction. To improve heat transfer of refrigerant 134, the volume fraction of refrigerant 134 as a liquid may be relatively high, as the liquid may be configured to transfer heat at a higher rate than a vapor.

Figure 1C:
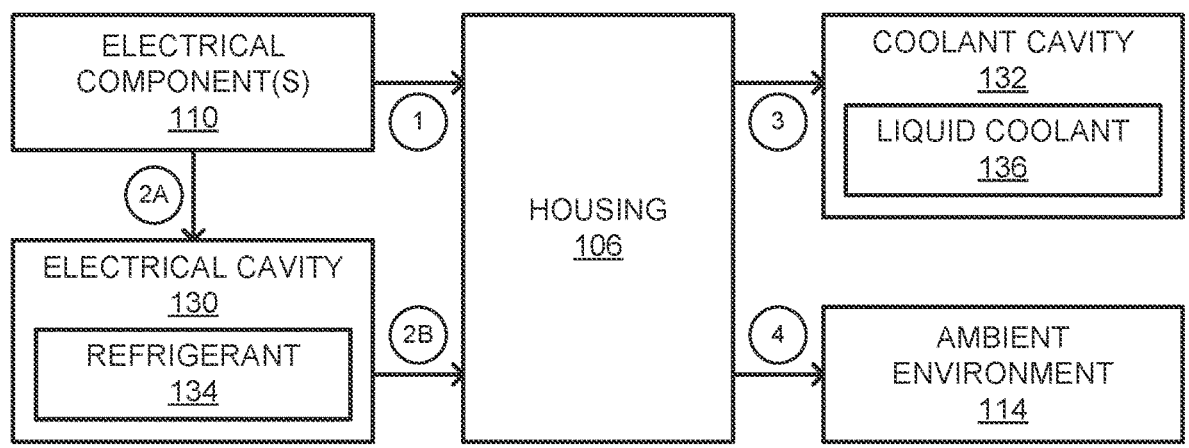
FIG. 1C is a schematic block diagram of heat transfer paths from electrical components of the example rotary mechanical system of FIG. 1B.

As mentioned above, housing 106 may define various heat transfer paths for removing heat from electrical components 110. FIG. 1C is a schematic block diagram of heat transfer paths from electrical components 110 of the example rotary mechanical system 102 of FIG. 1B to an external environment of rotary mechanical system 102, such as an ambient environment 138 or a liquid cooling system, such as liquid cooling system 104 of FIG. 1A.

In some examples, such as examples in which housing 106 physically supports or is attached to one or more electrical components 110, housing 106 may define a first heat transfer path (1) from one or more electrical components 110 to housing 106. For example, electrical components 110 coupled to housing 106 may transfer heat through conduction to a wall of housing 106, such as to the shared wall between coolant cavity 132 and electrical cavity 130. The first heat transfer path may remove a substantial amount of heat from portions of electrical components 110 near to the wall of housing 106. A variety of parameters of system 102 may be configured to improve heat transfer along the first heat transfer path including, but not limited to, increasing a surface area of electrical components 110 in contact with a wall of electrical cavity 130, increasing thermal transfer medium between electrical components 110 and housing 106, and other parameters that may increase conduction between electrical components 110 and housing 106.

Housing 106 defines a second heat transfer path (2A and 2B) from one or more electrical components 110 to refrigerant 134 in electrical cavity 130 and from refrigerant 134 in electrical cavity 130 to housing 106, such as to an inner surface of a wall defining electrical cavity 130. For example, surfaces of electrical components 110 exposed to refrigerant 134 in electrical cavity 130 may transfer heat to refrigerant 134. Some electrical components 110, such as electrical components near a bottom of electrical cavity 130, may transfer heat to refrigerant 134 in a liquid phase, while other electrical components 110, such as electrical components near a top of electrical cavity 130, may transfer heat to refrigerant 134 in a vapor phase. A variety of parameters of system 102 may be configured to improve transfer of heat from electrical components 110 to refrigerant 134 including, but not limited to, selecting refrigerant 134 having high thermal properties, such as specific heat, thermal conductivity, and latent heat of vaporization, increasing a phase composition of liquid refrigerant 134, increasing a surface area of electrical components 110 or heat sinks coupled to electrical components 110, and other parameters that may improve transfer of heat from electrical components 110 into refrigerant 134.

Heated refrigerant 134 may transfer at least a portion of the heat to housing 106. A surface area of electrical cavity 130 for heat transfer may be relatively large, such that a large amount of heat may be distributed from refrigerant 134 to housing 106 in a relatively even distribution. A variety of parameters of system 102 may be configured to improve transfer of heat from refrigerant 134 to housing 106 including, but not limited to, increasing a surface area of electrical cavity 130 (e.g., with cooling fins), increasing a phase composition of liquid refrigerant 134, and other parameters that may improve transfer of heat from refrigerant 134 to housing 106.

One such parameter—a Nusselt number (Nu) of refrigerant 134 sealed within housing 106—may be increased to improve heat removal from electrical components 110. The Nusselt number may represent a ratio of convective heat transfer to conductive heat transfer, and may be proportional to a convective heat transfer coefficient of refrigerant and a characteristic length of electrical cavity 130 (for average Nusselt number; for local Nusselt number, distance from component to wall of coolant cavity 130), and inversely proportional to thermal conductivity of refrigerant 134. By increasing various parameters that increase the convective heat transfer coefficient and the characteristic length, such as turbulent flow of refrigerant 134, a surface area of electrical cavity 130, or a ratio of volume to surface area, the amount of heat removed by refrigerant 134 may be increased.

Depending on a physical (e.g., contact) or spatial (e.g., distance) relationship of electrical components 110 to a wall of electrical cavity 130 and/or coolant cavity 132, particular electrical components 110 may discharge different amounts of heat through the first and second heat transfer paths. For example, portions of electrical components 110 attached to the wall of electrical cavity 130 and/or in close proximity to coolant cavity 132 may have a relatively large amount of heat discharged through the first heat transfer path and a relatively small amount of heat discharged through the second heat transfer path. In contrast, portions of electrical components 110 that are not attached to the wall of electrical cavity 130 or are located at a greater distance from the wall of electrical cavity 130 may have a relatively small or negligible amount of heat discharged through the first heat transfer path and a relatively large amount of heat discharged through the second heat transfer path.

In some examples, such as examples in which housing 106 includes coolant cavity 132 or another coolant structure (e.g., cooling jacket) thermally coupled to housing 106, housing 106 may define a third heat transfer path (3) from housing 106 to liquid coolant 136 in coolant cavity 132. For example, coolant cavity 132 may have a relatively large surface area, such that liquid coolant 136 flowing through coolant cavity 132 may remove a substantial amount of heat from housing 106. Heated liquid coolant 136 may be circulated to liquid cooling system 104 of FIG. 1A. While described as a liquid coolant, in some examples, liquid coolant 136 may be a two-phase coolant that includes a gaseous phase. A variety of parameters of system 102 may be configured to improve transfer of heat from housing 106 into liquid coolant 136 including, but not limited to, reducing a thickness of a wall between electrical cavity 130 and coolant cavity 132, increasing a surface area of coolant cavity 132, selecting liquid coolant 136 having high thermal properties, such as specific heat and thermal conductivity, increasing operating parameters of liquid coolant 136, such as temperature differential (e.g., reduced temperature of liquid coolant 136) and flow rate, and other parameters that may improve heat transfer from housing 106 to liquid coolant 136.

Housing 106 defines a fourth heat transfer path (4) from housing 106 to ambient environment 138, such as from an outer surface of a wall of housing 106. For example, housing 106 may have a high surface area exposed to ambient environment 138. Ambient environment 138 may have a lower temperature than housing 106, such that heat may transfer from housing 106 to a medium within ambient environment, such as air. In some examples, this heat transfer may be aided by convective flow of the medium in ambient environment 138. A variety of parameters of system 102 may be configured to improve heat transfer from housing 106 to ambient environment 138 including, but not limited to, increased surface area of an outer surface of housing 106, including heat sinks or baffles, increased flow rate of a convective medium around housing 106, such as cooling air, reduced temperature of the convective medium around housing 106, and other parameters that may improve heat transfer from housing 106 to ambient environment 138.

Figure 2:
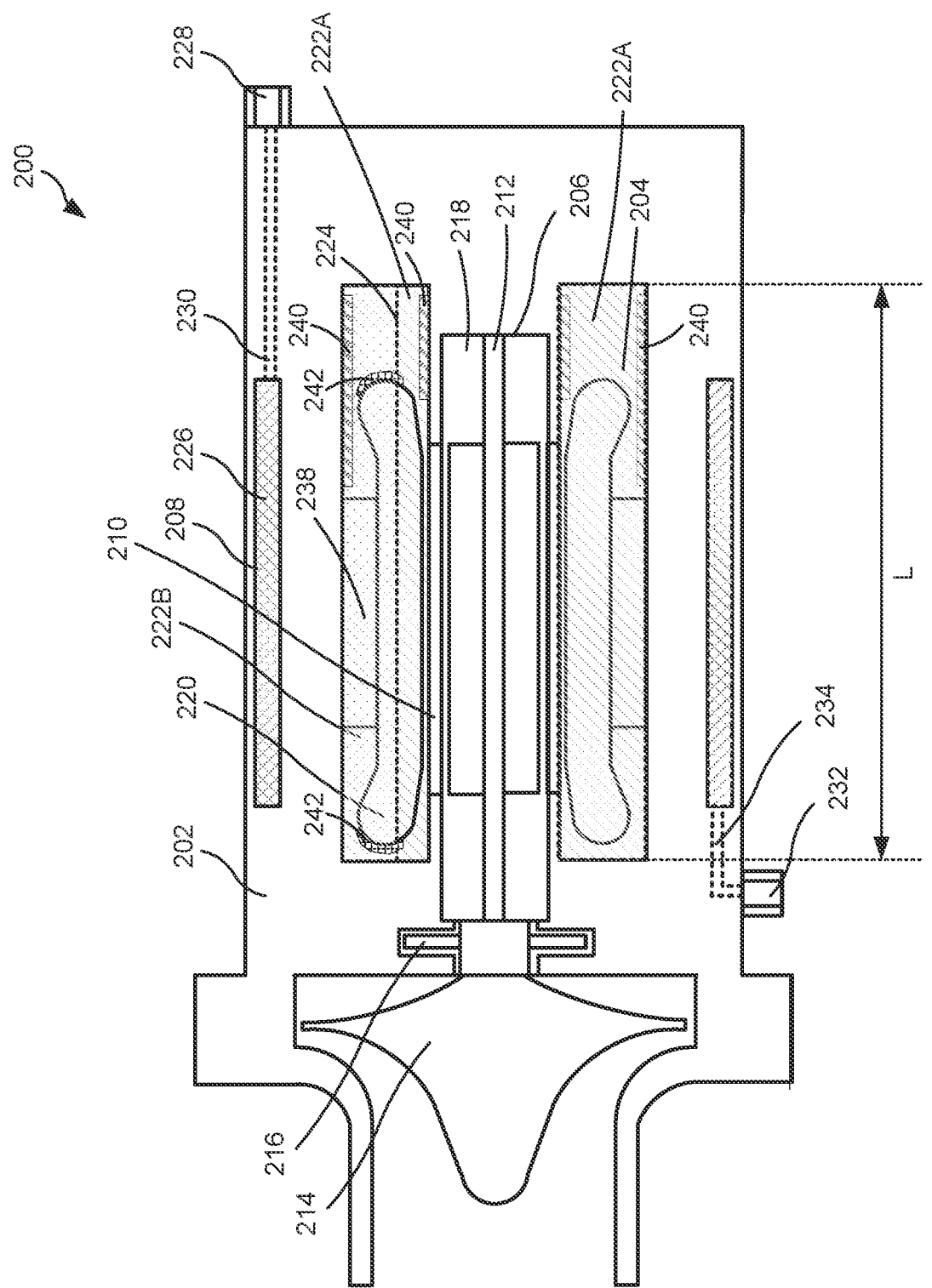
FIG. 2 is a side-view cross-sectional schematic of an example electric machine including a stator and a refrigerant within a housing and having a coolant that is separated from a portion of the electric machine by the housing.
Figure 3:
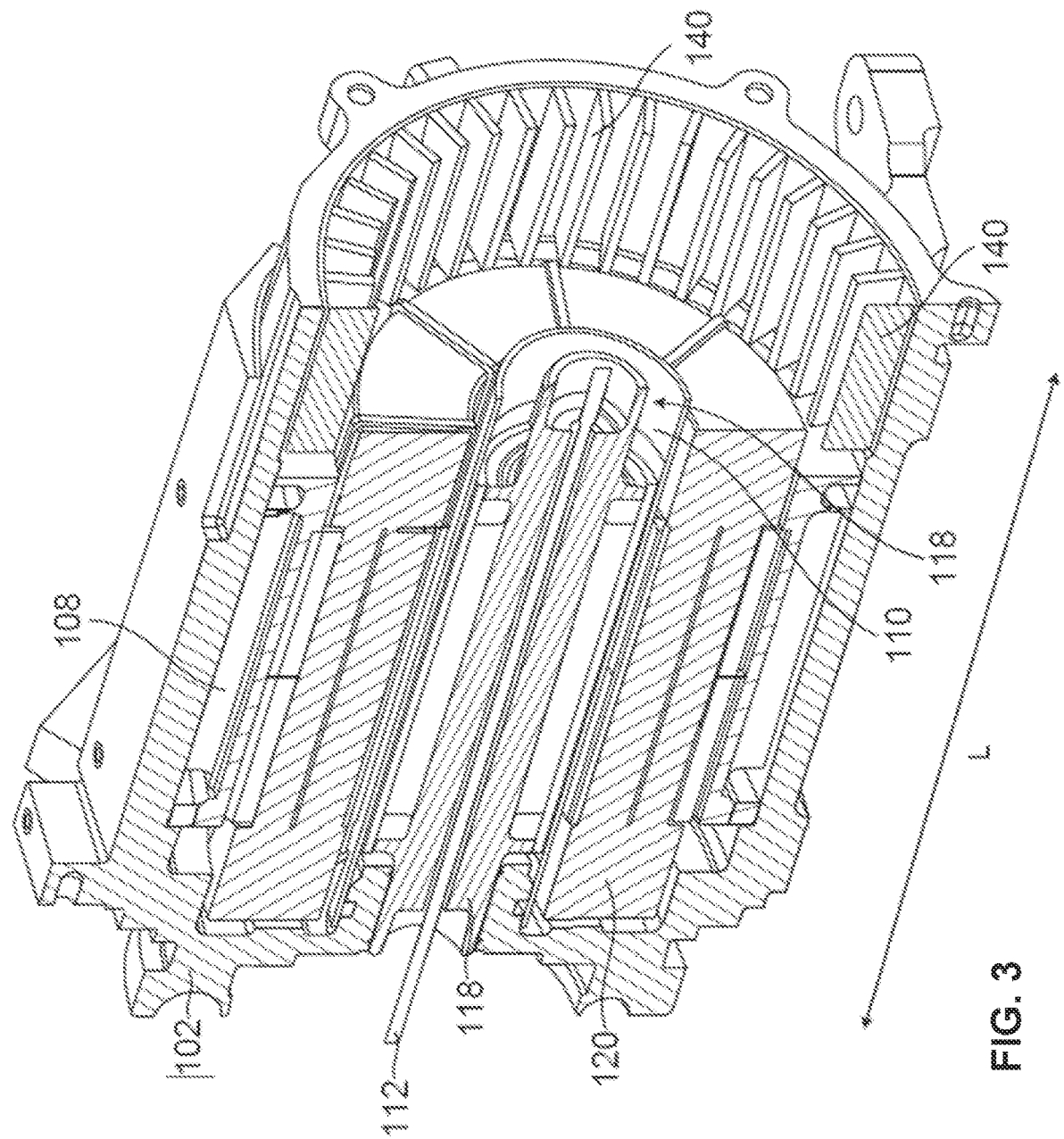
FIG. 3 is a perspective side view diagram illustrating the example rotary mechanical system 200 of FIG. 2.

Systems described herein may include a housing that is further differentiated between an electrical cavity having stationary components cooled by a two-phase refrigerant and an electrical cavity having moving components cooled by a low density gaseous medium. FIG. 2 is a cross-section side view diagram illustrating an example rotary mechanical system 200, e.g., electric machine 200. FIG. 3 is a perspective side view diagram illustrating the example rotary mechanical system 200 of FIG. 2, with some portions of components cut away for visibility. In the example of FIGS. 2 and 3, rotary mechanical system 200 is illustrated as a compressor that includes components of an electric motor. Rotary mechanical system 200 includes a shaft 212, one or more bearings 216 (e.g., illustrated as a journal bearing) coupled to shaft 212, and an impeller assembly 214 coupled to shaft 212. Shaft 212 may be configured to rotate within housing 202 supported by bearings 216. Impeller assembly 214 may be configured to receive mechanical energy from shaft 212 and use the mechanical energy to compress a fluid, such as a refrigerant, and discharge the pressurized fluid to another component or system. The electric machine of rotary mechanical system 200 may include a rotor 218 coupled to shaft 212 and a stator 220 coupled to housing 202. Stator 220 may generate a magnetic field that interacts with an electrical current in windings of rotor 218 to generate an electromotive force on rotor 218 and, correspondingly, shaft 212. In some examples, rotor 218 may include magnets rather than windings, and stator 220 may generate a magnetic field that interacts with magnetic fields of the magnets of rotor 218 to generate an electromotive force on rotor 218, and, correspondingly, shaft 212.

In some examples, rotary mechanical system 200 may be a high power density electric machine. For example, rotary mechanical system 200 may be configured to output greater than 100 kilowatts (kW) of power and to rotate rotor 218 at greater than 25,000 rotations per minute (rpm). In some examples, rotary mechanical system 200 may be configured to have an input voltage between 440 volts (V) and 620V.

Housing 202 defines one or more component cavities, including a stator cavity 204 housing stator 220, a rotor cavity 206 housing rotor 218 and a portion of shaft 212, and coolant cavity 208. In the example of FIG. 2, stator 220 is coupled to an inner surface of stator cavity 204, such as by a mount 238 or thermal medium. Stator cavity 204 includes a heat transfer material, such as a sealed two-phase refrigerant 222. During operation, two-phase refrigerant 222 is present as a liquid refrigerant 222A in a liquid phase and a vapor refrigerant 222B in a vapor phase. Liquid refrigerant 222A and vapor refrigerant 222B may be present at an equilibrium depending on a pressure and temperature within stator cavity 204. In some examples, housing 202 is configured to maintain a pressure range, e.g., within stator cavity 204, such that a first portion (e.g., volume fraction or mass) of the refrigerant is liquid refrigerant 222A and a second portion of the refrigerant is vapor refrigerant 222B. Stator cavity 204 and rotor cavity 206 are separated by a bore seal 210. Bore seal 210 may be configured to seal refrigerant 222 from rotor cavity 206. In some examples, such as shown in FIG. 2, stator 220 may be coupled to an inner surface of a shared wall between coolant cavity 208 and stator cavity 204.

Rotor 218 may include windings or other electrical and/or magnetic components that produce heat. To cool rotor 218, rotor cavity 206 may be configured to receive a cooling gas from impeller assembly 214. For example, impeller assembly 214 may axially discharge a small amount of compressed fluid around bearings 216 into rotor cavity 206. The compressed fluid may provide cooling to bearings 216, rotor 218, and a portion of shaft 212.

Coolant cavity 208 is configured to receive a liquid coolant from a liquid coolant system, such as liquid cooling system 104 of FIG. 1A. Coolant cavity 208 may be fluidically coupled to a coolant inlet 228 through an inlet channel 230 and a coolant outlet 232 through an outlet channel 234. In the example of FIG. 2, liquid coolant 226 may be configured to flow axially through coolant cavity 208; however, in other configurations, liquid coolant 226 may flow in other directions, including circumferentially. Coolant cavity 208 shares a wall with stator cavity 204. In some examples, the portion of housing 202 defining coolant cavity 208 may effectively be a cooling jacket. In other examples, housing 202 may not include coolant cavity 208 and may include a separate cooling jacket in thermal contact with an outer surface of housing 202 or an inner surface of housing 202, e.g., within stator cavity 204.

In some examples, liquid coolant 226 may be any material having a relatively high heat capacity and a relatively high heat conductivity. In some examples, liquid coolant 226 may be water-glycol or ethylene glycol (EGW) configured to cool at a temperature of about 70 degrees Celsius (C). In some examples, the coolant may be about 50% water and about 50% ethylene glycol.

During operation, housing 202 defines a first heat transfer path for directly transferring heat from stator 220 to housing 202 through conduction and a second heat transfer path for indirectly transferring heat from stator 220 to liquid coolant 226 via refrigerant 222 through convection. The first heat transfer path is from stator 220 to the shared wall between coolant cavity 208 and stator cavity 204 and to liquid coolant 226 in coolant cavity 208. The second heat transfer path is from stator 220 to refrigerant 222 in stator cavity 204. As shown in FIG. 2, refrigerant 222 may include a liquid refrigerant 222A and a vapor refrigerant 222B. A volume fraction of liquid refrigerant 222A and vapor refrigerant 222B may change during operation of rotary mechanical system 200. For example, liquid refrigerant 222A contacting stator 220 may vaporize. This vaporized heat may transfer heat to liquid refrigerant 222A or collect as vapor refrigerant 222B to condense on cooling portions of housing 202, such as an inner surface of stator cavity 206 or one or more heat sink structures, e.g., cooling fins 240, within stator cavity 206. While a relatively high volume fraction of refrigerant 222 within stator cavity 206 may be liquid refrigerant 222A, at least a portion of refrigerant 222 may be vapor refrigerant 222B to permit thermal expansion of liquid refrigerant 222A. In some examples, housing 202 is configured to maintain a pressure range within stator cavity 204 corresponding to a volume fraction range for both liquid refrigerant 222A and vapor refrigerant 22B.

In some examples, an inner surface of the housing 202 comprises a plurality of structures 240 configured to increase an inner surface area of housing 202 and configured to contact the heat transfer material, e.g., liquid refrigerant 222A and/or vapor refrigerant 222B. For example, an inner surface of housing 202 within stator cavity 204 may including a plurality of cooling fins 240 thermally coupled to housing 202 and configured to increase an amount and/or rate of heat transfer to the coolant, e.g., via the second heat transfer path (from stator 220 to liquid coolant 226 via refrigerant 222 through convection) by effectively increasing the surface area of housing 202 in contact with refrigerant 222. Additionally, cooling fins 240 provide increased surface area to increase condensation of vapor refrigerant 222B, e.g., above the liquid level 224 of liquid refrigerant 222A, via conduction of heat to cooling fins 240 and thereby increasing the heat transfer to housing 202 and ultimately to liquid coolant 226. Additionally, cooling fins 240 may guide condensed refrigerant, or refrigerant droplets, to electrical components, e.g., to rain down on stator 220 and vaporize, thereby transferring heat from stator 220 to the refrigerant, which may condense and transfer heat again on an inner surface of housing 202 or cooling fins 240. Some of the condensed refrigerant may rain down to liquid refrigerant 222A, adding to the volume fraction of liquid refrigerant 222A that is reduced by boiling/vaporization of the liquid refrigerant 222A as the liquid refrigerant 222A receives heat from stator 220. In some examples, cooling fins 240 may be located near one or both of the longitudinal ends of stator cavity 204, and in other examples cooling fins 240 may extend the entire longitudinal length L of stator cavity 204.

In some examples, cooling fins 240 may be integrally made with housing 202, e.g., made of the same material and formed with housing 202. In other examples, cooling fins 240 may be made of the same or different material as housing 202 and attached to housing 202. In other examples, cooling fins may be additively onto surfaces of housing 202, e.g., the inner surface of stator cavity 204 by printing, and may be an inorganic or organic material.

In some examples, cooling fins 240 may increase the amount and/or rate of heat transfer for portions of stator 220 at or near the longitudinal ends of stator cavity 204, e.g., those portions that are relatively far from, or not in contact with, mount 238 and/or a stator back iron. Mount 238 may be a stator back iron, and may be a metal. In some examples, mount 238 may have an electrical insulator disposed between stator 220 windings and mount 238. The portion of stator 220 closer to mount 238 may transfer a greater amount of heat, e.g., via conduction, through the insulator to mount 238 than portions of stator 220 at or near the longitudinal ends. Mount 238 may transfer heat directly to housing 202 via conduction.

In some examples, refrigerant 222 may be HFO-1233zd, r-1233zd, R-11, or R-123, or any suitable heat transfer material configured to transfer heat from stator 220 to housing 202. In some examples, refrigerant 222 is an electrically non-conductive material or a material with a relatively low electrical conductance.

In some examples, rotary mechanical system 200 may include liquid moving structures 242, e.g., wicking structures 242. Wicking structures 242 may be wrapped around stator 220 and/or portions of stator 220, e.g., longitudinal end portions. Wicking structures 242 may be positioned such that a portion of wicking structures 242 are within liquid refrigerant 222A, e.g., below liquid level 224 of liquid refrigerant 222A, and are configured to cause liquid refrigerant 222A to move to be in contact with portions of stator 220 above liquid level 224 of liquid refrigerant 222A, e.g., via wicking. In some examples, wicking structures may comprise a wool, a fiberglass, or any suitable material and/or material blend to wick liquid refrigerant.

Select examples of the present disclosure include, but are not limited to, the following examples.

Example 1: A system includes: a housing configured to house a portion of an electric machine and a heat transfer material, wherein the heat transfer material is configured to contact a conductor of the portion of the electric machine, wherein the heat transfer material is configured to remove heat from the conductor and transfer heat to the housing; and a coolant configured to remove heat from the housing, wherein an inner surface of the housing comprises a plurality of structures configured to increase an inner surface area of the housing, wherein the plurality of structures are configured to contact the heat transfer material.

Example 2: The system of example 1, wherein the heat transfer material is a refrigerant.

Example 3: The system of example 2, wherein the refrigerant is at least one of HFO-1233zd, r-1233zd, R-11, or R-123.

Example 4: The system of any one of examples 1 through 3, wherein the plurality of structures comprise a plurality cooling fins.

Example 5: The system of any one of examples 2 through 4, wherein a portion of the refrigerant is vaporized and a portion of the refrigerant is liquid, wherein the plurality of structures are configured to cause vaporized refrigerant to condense on the surface area of the structures.

Example 6: The system of example 5, wherein the plurality of structures are configured to direct condensed refrigerant to contact a conductor or to contact the liquid refrigerant.

Example 7: The system of any one of examples 2 through 6, wherein the refrigerant is electrically non-conductive.

Example 8: The system of any one of examples 1 through 7, wherein the coolant is ethylene glycol or water-glycol.

Example 9: The system of any one of examples 2 through 8, wherein the housing is configured to maintain a pressure range, wherein the pressure range is such that a first portion of the refrigerant is liquid and a second portion of the refrigerant is vapor.

Example 10: The system of example 9, wherein the housing is configured to contain the refrigerant within a stator portion of the housing separate from a rotor portion of the housing and separate from the coolant.

Example 11: The system of example 10, wherein the housing comprises a cooling jacket further configured to guide a flow of the coolant within the cooling jacket via one or more channels separate from the stator portion of the housing.

Example 12: The system of any of examples 2 through 11, further comprising a wicking structure configured to move the liquid refrigerant to a portion of the conductor above a liquid refrigerant level.

Example 13: A mechanical and cooling system, comprising; a rotary mechanical system, comprising: an electric machine; a housing at least partially enclosing one or more components of the electric machine, the housing defining: an electrical cavity housing one or more electrical components, wherein an inner surface of the housing comprises a plurality of structures configured to increase an inner surface area of the electrical cavity; and a coolant cavity, wherein the housing includes a two-phase refrigerant sealed within the electrical cavity; and a liquid cooling system fluidically coupled to the coolant cavity and configured to supply a liquid coolant to the coolant cavity.

Example 14: The mechanical and cooling system of example 13, wherein the refrigerant is at least one of HFO-1233zd, r-1233zd, R-11, or R-123.

Example 15: The mechanical and cooling system of example 13 or example 14, wherein a portion of the two-phase refrigerant is vaporized and a portion of the two-phase refrigerant is liquid, wherein the plurality of structures are configured to cause vaporized two-phase refrigerant to condense on the surface area of the structures.

Example 16: The mechanical and cooling system of example 15, wherein the plurality of structures are configured to direct condensed two-phase refrigerant to contact the one or more electrical components or to contact the liquid refrigerant.

Example 17: The mechanical and cooling system of any one of examples 13 through 16, wherein the two-phase refrigerant is electrically non-conductive.

Example 18: The mechanical and cooling system of any one of examples 13 through 17, wherein the housing is configured to maintain a pressure range within the electrical cavity, wherein the pressure range is such that a first portion of the two-phase refrigerant is liquid and a second portion of the two-phase refrigerant is vapor.

Example 19: The mechanical and cooling system of any one of examples 13 through 18, further comprising a wicking structure configured to move liquid refrigerant to a portion of the conductor above a liquid refrigerant level.

Example 20: The mechanical and cooling system of any one of examples 13 through 19, wherein the plurality of structures comprise a plurality cooling fins.

Various examples have been described. These and other examples are within the scope of the following claims.

What is claimed is:

1. A system comprising:
a housing configured to house a portion of an electric machine and a refrigerant, wherein the refrigerant is configured to contact a conductor of the portion of the electric machine, wherein the refrigerant is configured to remove heat from the conductor and transfer heat to the housing; and
a coolant configured to remove heat from the housing,
wherein an inner surface of the housing comprises a plurality of structures configured to increase an inner surface area of the housing, wherein the plurality of structures are configured to contact the refrigerant,
wherein a portion of the refrigerant is vaporized and a portion of the refrigerant is liquid, wherein the plurality of structures are configured to cause vaporized refrigerant to condense on a surface area of the structures,
wherein the plurality of structures are configured to direct condensed refrigerant to contact the conductor.

2. The system of claim 1, wherein the refrigerant is at least one of HFO-1233zd, r-1233zd, R-11, or R-123.

3. The system of claim 1, wherein the plurality of structures comprise a plurality cooling fins.

4. The system of claim 1, wherein the refrigerant is electrically non-conductive.

5. The system of claim 1, wherein the coolant is ethylene glycol or water-glycol.

6. The system of claim 1, wherein the housing is configured to maintain a pressure range, wherein the pressure range is such that a first portion of the refrigerant is liquid and a second portion of the refrigerant is vapor.

7. The system of claim 6, wherein the housing is configured to contain the refrigerant within a stator portion of the housing separate from a rotor portion of the housing and separate from the coolant.

8. The system of claim 7, wherein the housing comprises a cooling jacket further configured to guide a flow of the coolant within the cooling jacket via one or more channels separate from the stator portion of the housing.

9. The system of claim 6, further comprising a wicking structure configured to move the first portion of the refrigerant that is liquid to a portion of the conductor above a liquid refrigerant level.

10. A mechanical and cooling system, comprising;
a rotary mechanical system, comprising:
an electric machine;
a housing at least partially enclosing one or more components of the electric machine, the housing defining:
an electrical cavity housing one or more electrical components, wherein an inner surface of the housing comprises a plurality of structures configured to increase an inner surface area of the electrical cavity; and
a coolant cavity,
wherein the housing includes a two-phase refrigerant sealed within the electrical cavity,
wherein a portion of the two-phase refrigerant is vaporized and a portion of the two-phase refrigerant is liquid, wherein the plurality of structures are configured to cause vaporized two-phase refrigerant to condense on a surface area of the structures,
wherein the plurality of structures are configured to direct condensed two-phase refrigerant to contact the one or more electrical components or to contact the liquid refrigerant; and
a liquid cooling system fluidically coupled to the coolant cavity and configured to supply a liquid coolant to the coolant cavity.

11. The mechanical and cooling system of claim 10, wherein the refrigerant is at least one of HFO-1233zd, r-1233zd, R-11, or R-123.

12. The mechanical and cooling system of claim 10, wherein the two-phase refrigerant is electrically non-conductive.

13. The mechanical and cooling system of claim 10, wherein the housing is configured to maintain a pressure range within the electrical cavity, wherein the pressure range is such that a first portion of the two-phase refrigerant is liquid and a second portion of the two-phase refrigerant is vapor.

14. The mechanical and cooling system of claim 13, further comprising a wicking structure configured to move the first portion of the two-phase refrigerant that is liquid to a portion of the conductor above a liquid refrigerant level.

15. The mechanical and cooling system of claim 10, wherein the plurality of structures comprise a plurality cooling fins.

\* \* \* \* \*